United States Patent [19]

Cramer

[11] 3,928,010
[45] Dec. 23, 1975

[54] METHOD AND APPARATUS FOR FORMING GLASS ON MOLTEN METAL BY USING A RADIATION REFLECTOR

[75] Inventor: Deane G. Cramer, Festus, Mo.

[73] Assignee: PPG Industries, Inc., Pittsburgh, Pa.

[22] Filed: May 30, 1974

[21] Appl. No.: 474,847

[52] U.S. Cl.................. 65/65 A; 65/99 A; 65/182 R
[51] Int. Cl.².......................................... C03B 18/02
[58] Field of Search............... 65/65 A, 99 A, 182 R

[56] References Cited
UNITED STATES PATENTS

| | | | |
|---|---|---|---|
| 3,333,936 | 8/1967 | Warren | 65/65 A X |
| 3,485,614 | 12/1969 | Long | 65/65 A X |
| 3,494,755 | 2/1970 | Montgomery | 65/99 A X |

Primary Examiner—Arthur D. Kellogg
Attorney, Agent, or Firm—E. Kears Pollock

[57] ABSTRACT

A radiation reflector in the inlet portion of a flat glass forming chamber is used to reflect sufficient heat that is radiated from the glass immediately after delivery onto molten metal in the chamber back to the glass so that the glass loses heat relatively more rapidly through its bottom surface than through its top surface and is maintained sufficiently hot immediately following delivery onto the molten metal to have an average viscosity between $10^3$ and $10^5$ poises during its initial residence on the molten metal and to have an initial rate of temperature decline that is slow relative to its rate of temperature decline thereafter. The glass produced is of improved optical flatness.

19 Claims, 3 Drawing Figures ated by

METHOD AND APPARATUS FOR FORMING GLASS ON MOLTEN METAL BY USING A RADIATION REFLECTOR

BACKGROUND OF THE INVENTION

This invention relates to the manufacture of flat glass by forming it while supporting it on molten metal. More particularly, this invention relates to an improved method for thermally conditioning molten glass immediately following delivery onto molten metal for forming.

There are several known processes for making flat glass by forming it from a body of glass supported on molten metal. Molten glass may be delivered onto a pool of molten metal, such as molten tin, and cooled and advanced along the surface of the molten metal to form a continuous sheet or ribbon of glass according to the teachings of Heal, U.S. Pat. No. 710,357; of Hitchcock, U.S. Pat. No. 789,911; and of Pilkington U.S. Pat. Nos. 2,911,159, 3,083,551 and 3,220,816.

From the earliest of these disclosures it has been appreciated that the temperature of the glass may be controlled while the glass is supported on the molten metal. According to Heal, ". . . by varying the temperature in the heating chambers the flow of the sheet may be accelerated or retarded in proportion to the varying degreee of fluidity of the glass . . . ." The disclosure of Hitchcock primarily concerns the division of the molten metal into segregated pools so that controlled cooling of the glass would be facilitated. Hitchcock also disclosed the use of burners to heat an arch roof extending over the molten glass being supported by and formed on the molten metal.

According to more recent patents, workers in the art have coordinated temperature control with the application of tractive forces to glass being formed in order to produce flat glass of varying thicknesses. For example, U.S. Pat. No. 3,352,657 to Charnock discloses a method for making flat glass in which the glass, upon delivery onto molten metal in a forming chamber, is immediately cooled at a rapid rate and thereafter maintained at a substantially constant temperature for a prolonged period while applying longitudinal traction forces to the glass at two locations and permitting the edges of the glass to be laterally unconstrained. According to this patent, flat glass of less than equilibrium thickness may be made in the manner described. (Equilibrium thickness glass is flat glass having the thickness that it will attain when permitted to rest as molten glass on a pool of molten metal until it ceases to spread outwardly on the molten metal.) According to the patent of Charnock the hot glass that is supported on molten metal for forming has its temperature controlled by undefined temperature regulators located above and below the glass at locations well downstream for the inlet end of a forming chamber.

In each of the forming chambers described in these patents a substantial space exists above the molten glass and beneath whatever overhead roof structure may be provided, Except in the apparatus of Hitchcock, these forming chambers are such that their roof portions are subjected to direct external cooling by the outside atmosphere or environment. Even the structure of Hitchcock must not be heated sufficiently to result in the destruction of the roof itself. Thus, the loss of heat from the molten glass immediately upon delivery onto the molten metal would be expected to be substantial. In fact, in the operation of a forming chamber similar to that shown in the patent of Charnock, it is not unusual for molten glass entering the chamber at the lip at 2020°F. (1105°C.) to be cooled to less than 1440°F. (780°C.) within its initial 5 minutes of residence in the forming chamber. This confirms the steep initial temperature decline disclosed in FIG. 3 of U.S. Pat. No. 3,352,657 to Charnock.

Flat glass produced by the techniques of Pilkington (including the variation of Charnock) or by techniques which are improvements of the basic Heal or Hitchcock processes has generally good optical quality. Such glasses are generally optically flatter than flat glasses produced by so called sheet processes, such as the Pittsburgh process, the Colburn process or the Fourcault process. That is, these glasses are not characterized by optical distortion as intense as that which characterizes sheet glasses. Nevertheless, flat glass produced by supporting it on molten metal during forming is characterized by some optical distortion. This is more evident in thin glasses than in thick glasses, particularly equilibrium glass, and is more evident when the glass is observed at a small angle by reflected light rather than at an angle of about 90 degrees by transmitted light.

The optical distortion is variously called "batter", "broken-line distortion" and "reflective distortion." The optical distortion may be qualitatively evaluated by observing a shadow projection of the glass, using a point light source and positioning the glass at an angle with respect to a target screen on which an image of the glass is projected. The optical distortion may also be observed in Schlerin photographs of the glass. The optical distortion pattern is regular, repetitive and anisotropic in glass produced by methods like that of Pilkington wherein the glass falls onto the molten metal, spreads outwardly and then is drawn inwardly again. In glass produced while maintaining its width unchanged the distortion pattern is regular, repetitive and isotropic. In both types of glass the distortion is sufficiently intense (i.e., the variation of lightness to darkness in a projected shadow is great) to be easily observed by even an untrained eye when the glass is coated with a reflective coating and observed by reflected light.

The optical distortion apparent in flat glass is recognized as an effect that may be caused by variations in the surfaces of the glass. If the surfaces are not flat but rather are characteristic by a plurality of elevations and depressions a beam of light passing through the glass will be distorted. This may be established by measuring the optical distortion of glass during production using a device such as that disclosed and claimed by Simko in U.S. Pat. No. 3,799,679 or by determining the surface variations of a sheet of glass from its optical characteristics in the manner described in U.S. Pat. No. 3,792,930 to Obenreder.

The present invention provides a method for making glass of improved optical quality having distortion of decreased intensity.

SUMMARY OF THE INVENTION

A radiation reflector is positioned above the molten metal in a glass forming chamber immediately downstream of its inlet end. The radiation reflector extends across a sufficient portion of the forming chamber so that molten glass flowing into the forming chamber passes beneath the reflector. The reflector serves to reflect heat radiated from the molten glass back to the molten glass and to some extent through it to the molten metal. Sufficient heat is reflected back to the glass to maintain its temperature and viscosity within desired ranges during initial residence on the molten metal so that glass of improved flatness is produced. The glass is maintained hot enough during this initial residence on the molten metal to maintain its viscosity in the range from $10^3$ to $10^5$ poises. Sufficient heat is reflected back to the glass to keep its rate of temperature decline during this initial residence time below about 100°F. per minute (63°C. per minute) and preferably below about 90°F. per minute (50°C. per minute). The initial residence time during which such thermal control is maintained is at least about 2 minutes and preferably at least about 5 minutes. After this initial slow cooling the glass may be cooled relatively more rapidly without harming the quality of the glass produced.

A radiation reflector is most effectively employed in combination with a glass forming chamber in which glass flows unidirectionally into the chamber and along the molten metal. In such an apparatus the radiation reflector may be positioned sufficiently close to the glass so that, in a thermal sense, it acts as an infinite plane reflector without substantial loss of effectiveness at the edges of the stream of molten glass due to any field-of-view effect. Despite the preferred combination, this invention may be practiced in an apparatus wherein molten glass flows downward then forward as in Heal's apparatus, or downward, rearward, outward and then forward as in Pilkington's apparatus.

The radiation reflector may have a flat reflecting surface for facing the glass, or its reflecting surface may be shaped to maintain particular thermal patterns having particular utilities beyond the minimization of optical distortion by overall temperature control. For example, the radiation reflector may have a convex, downwardly facing reflecting surface to reflect more heat to the edges of a stream of glass than at its central portion. Such a reflector can be used to compensate for heat loss through the sides of a forming chamber.

The radiation reflector may extend across the full width of a forming chamber or may be of narrower dimension. It is desirable that the radiation reflector extend at least beyond the edges of a stream of glass that is delivered to the chamber for forming. The radiation reflector may comprise two separate reflecting surfaces spaced from one another so that heat radiated from the central portion of the glass is not reflected while heat is reflected to the edges of the glass. This may be done to control the relative flow of glass in the central portion of the stream relative to its flow in the marginal portions of the stream. Such an adjustment in flow rates can affect the quality of glass produced.

The radiation reflector will preferably have a reflecting surface that is highly reflective in the infrared region of the radiated energy spectrum. The heat reflecting surface of the reflector should be the surface of a material that will maintain its infrared reflectivity for extended periods in a hot environment containing sulfur, reducing gases, metal vapors and products of reaction of such materials with molten glass. For example, the reflecting surface material will preferably be a material that maintaining its structural and chemical integrity at temperatures in excess of 2000°F. (1095°C.) and preferably in excess of 2500°F. (1360°C.). Refractory materials or metals may be used to construct the reflector. The reflective surface may be silica, alumina, silicon carbide, molybdenum disilicide or a like refractory material. However, a metal reflective surface is preferred. Stainless steel has been found to be a particularly suitable material to use for constructing a radiation reflector face.

Since the atmosphere above a pool of molten metal in a glass forming chamber contains condensible materials (see U.S. Pat. No. 3,356,476 to Gulotta and U.S. Pat. No. 3,597,178 to Tilton), it is desirable to maintain the radiation reflector at a sufficient temperature relative to the glass and the atmosphere so that condensible materials do not condense on the face of the reflector and fall onto the glass contaminating it. Although these materials could be deliberately condensed on a condensate intercepting structure closely spaced to the reflector and directed toward the sides of the forming chamber in the manner described in U.S. Pat. No. 3,494,755 to Montgomery or as described in U.S. Pat. No. 3,597,178 to Tilton, it is preferred that the entire region in which the radiation reflector is disposed be maintained at a temperature at which contaminant condensation is unlikely. This is so since condensation of contaminants on the reflecting face could diminish its reflectivity and cause its use to be less effective than desired.

The radiation reflector employed in this invention is preferably located from 2 to 18 inches from the upper surface of a stream of molten glass flowing beneath it. The closer the reflector is placed to the molten glass, the more it acts as a reflector of infinite size; it is therefore desirable to have the reflector close to the molten glass and to reflect as much heat as possible back to the glass.

More than one reflector may be effectively used to control glass temperature. Where a series of reflectors are used, the one closest to the delivery means is preferably closest to the molten glass on the molten metal and successive reflectors are elevated successively greater distances above the elevation of the molten metal. Such an arrangement is useful because the radiation reflectors serve to inhibit the movement of the atmosphere above the molten glass. A gradually diminishing space extending above the molten glass toward the inlet end of the forming chamber results in the gradual reduction in atmosphere flow above the glass as the atmosphere gases approach the hotter glass at the inlet end of the forming chamber. Thus, convective heat loss from the glass is minimized and controlled at the inlet end of the forming chamber. This heat loss has been thought to be non-uniform and a possible cause of undulations in the surface of glass. In any event, the use of the reflectors in this manner results in the production of glass of uniform surface quality.

Since the reflector face becomes quite hot during use, it is desirable to construct the reflector as a relatively thin face plate mounted on a back-up plate which in turn is suspended from a support above the glass. This back-up plate may be replaced by a thermal insulator or thermal insulation may be placed between the reflector face plate and the back-up plate. The assembly may be supported from the roof of the forming chamber or delivery means or may be supported from a supporting element extended into the chamber. A suitable supporting element is a pipe extending through the side walls of the delivery means. Such a pipe may be cooled without unduly cooling the reflector.

This invention will be further understood from the accompanying drawings.

DESCRIPTION OF THE PREFERRED EMBODIMENTS

Figure 1:
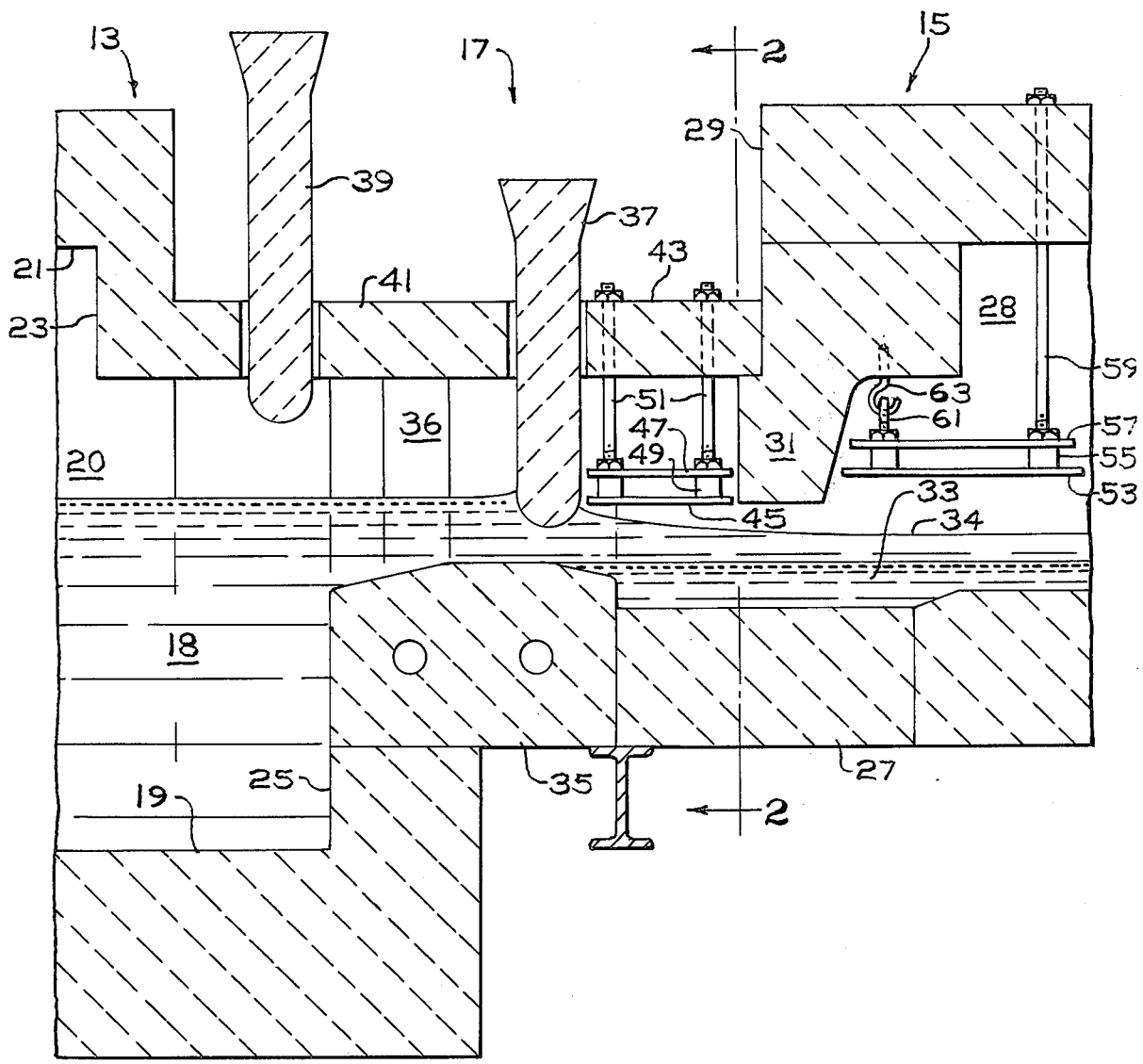
FIG. 1 is a longitudinal sectional elevation of a molten glass delivery means connected to the inlet end of a glass forming chamber with the radiation reflectors of this invention mounted therein.

Referring now to FIG. 1, there is shown the refiner 13 of a glassmaking furnace connected to a flat glass forming chamber 15 through a delivery means 17. The refiner 13 contains a pool of molten glass 18. The refiner includes a bottom 19, side walls 20, a roof 21, a front wall 23 and a front basin wall 25. The forming chamber 15 includes a bottom 27, side walls 28, a roof 29 and an inlet wall or lintel 31. A pool of molten metal 33, preferably tin, is maintained in the bottom portion of the forming chamber 15. A stream of molten glass 34 flows from the refiner 13 onto the pool of molten metal 33 for cooling and forming.

The delivery means 17 includes a threshold 35 over which molten glass flows from the refiner 13 to the forming chamber 15. The threshold 35 rests on the basin wall 25 and on a structural support adjacent the forming chamber 15. The threshold extends transversely across the inlet end of the forming chamber 15. The delivery means 17 also includes side members or jambs 36 extending upwardly at the ends of the threshold 35 and transversely disposed metering members or tweels 37 and 39 which extend downwardly for engaging the molten glass and controlling its flow over the threshold 35. The delivery means 17 also includes a roof section 41 and 43 extending over the threshold region and joining the side members 36 on opposite ends of the threshold 35.

A first radiation reflector is positioned between the downstream tweel 37 (also called a control tweel) and the lintel 31. This radiation reflector comprises a reflector face plate 45 with a reflective surface facing downwardly and a back-up plate 47 connected to the face plate 45 by spacers 49. Thermal insulation, such as for example KAOWOOL insulation sold by Babcock and Wilcox Co. may be placed on the upper surface of the face plate to minimize heat loss from it to the roof. The reflector is supported from the roof 43 by rods 51. The reflector is positioned about 4 inches above the intended elevation for molten glass and extends across the width of the delivery means between the side members 36. Sufficient space is provided around the reflector to permit easy installation and removal. The split reflector shown in FIG. 2 is an alternate embodiment for a convenient reflector may extend across the full width of the unit with plate 45 being a single, continuous plate.

A second, optional reflector is positioned in the forming chamber. This reflector comprises a face plate 53 connected by spacers 55 to a back-up plate 57 which is suspended by rods 59 and eyes 61 and hooks 63 from the overhead structure (lintel 31 and roof 29) of the forming chamber 15. The face plate 53 of the downstream reflector is spaced higher (relative to the intended glass surface elevation) than the face plate 45 of the upstream reflector.

Figure 2:
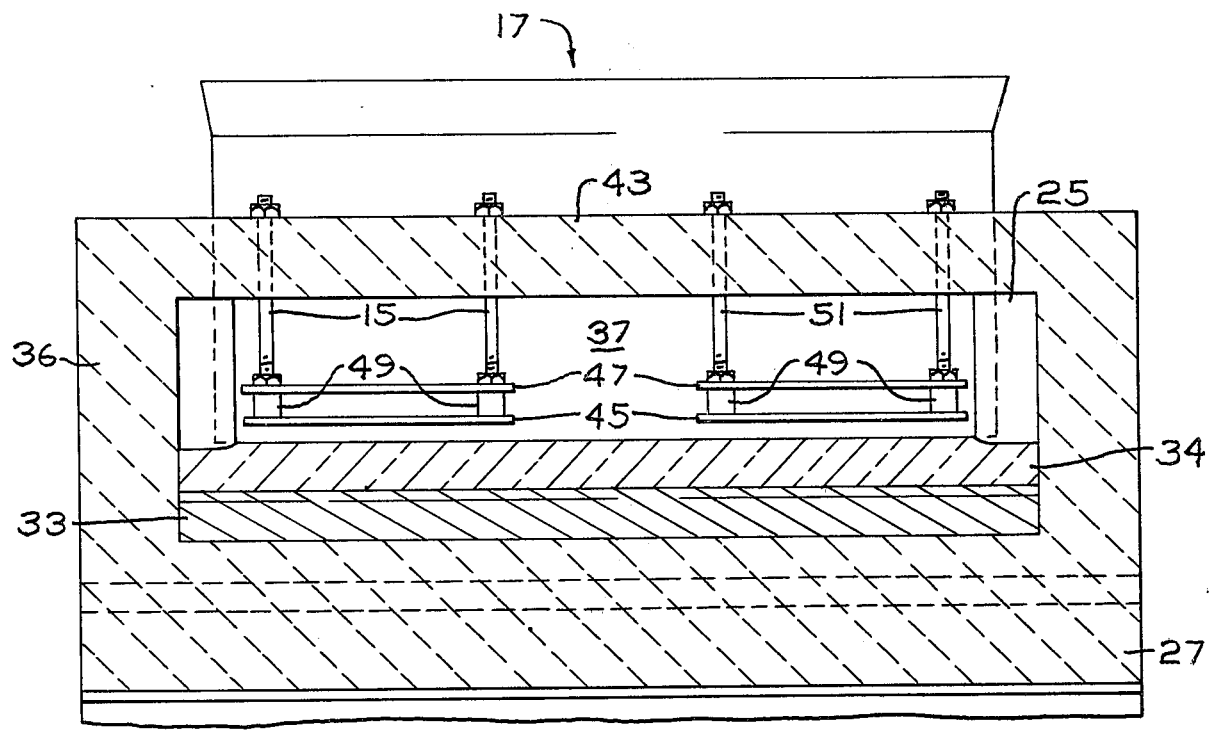
FIG. 2 is a transverse sectional elevation of the delivery means in FIG. 1 taken along section line 2—2.

In FIG. 2 there is shown a split reflector with an open space above the central portion of the stream of molten glass. Use of this reflector permits retention of relatively more heat in the marginal portions of the stream of glass than in the central portion. Even though the central portion of the stream may retain a higher absolute temperature than the marginal portions, its heat loss may be greater so that there is a general flowing and flattening of the glass.

Figure 3:
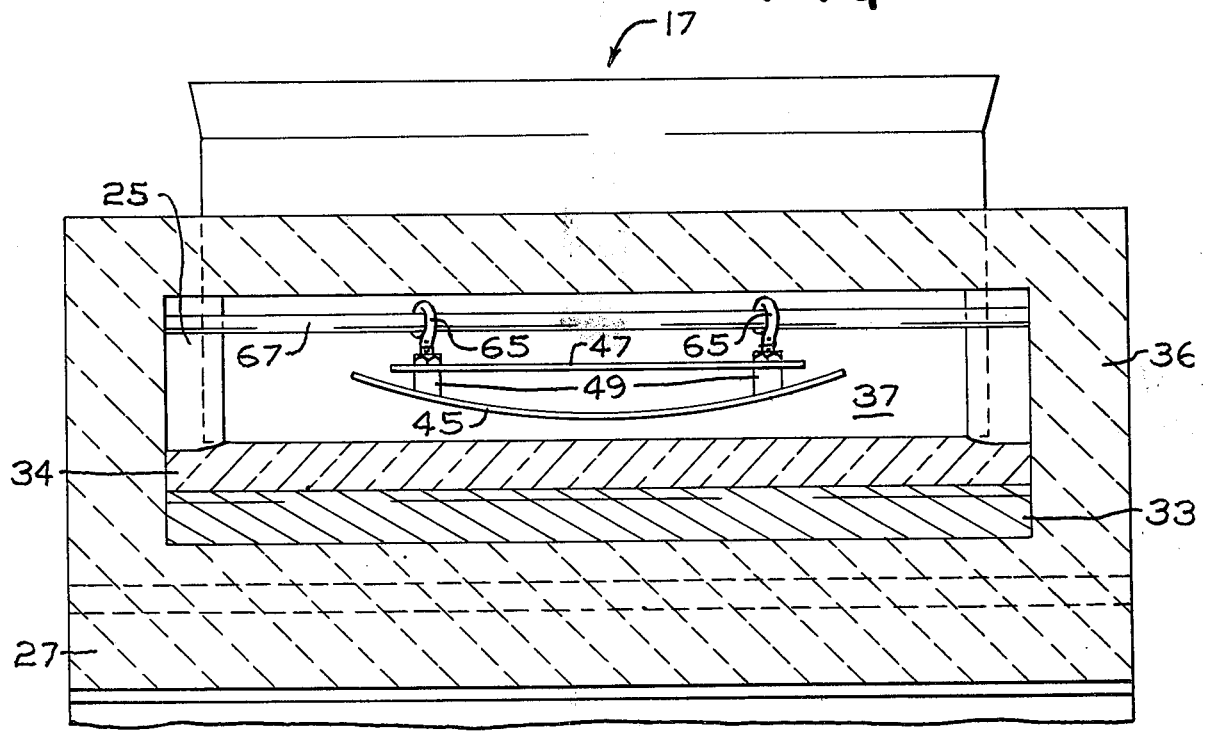
FIG. 3 is a transverse sectional elevation similar to FIG. 2 of an alternate embodiment of this invention.

In FIG. 3 there is shown a further embodiment of this invention. A downwardly facing convex reflector is provided. This reflector reflects heat from the central portion of the stream of glass toward the marginal portions of the stream to establish more uniform temperatures across the stream and thereby enhance uniform glass flow to flatten it. An alternate reflector support is shown. The back-up plate 47 is connected to hooks 65 which engage a pipe 67 extending across the width of the delivery means. Water may be directed through the pipe 67 to cool it and thereby maintain its alignment.

The use of a radiation reflector such as described there results in a general increase in glass temperature just downstream of the lintel so long as the temperature of the molten glass upstream of the tweel 37 is maintained.

In the following examples the effects derived from the use of radiation reflectors may be noted.

EXAMPLE I

Flat glass is produced in a forming chamber of the type described above and in the copending application of Edge and Kunkle for "Manufacture of Glass by a Contiguous Float Process", Ser. No. 338,497 filed Mar. 6, 1973 and incorporated by reference herein. That application is now U.S. Pat. No. 3,843,346 issued Oct. 22, 1974. Molten soda-lime-silica glass is delivered as a stream about 6 feet (1.83 meters) wide and ¾ to 1 inch (1.9 to 2.5 centimeters) deep onto the surface of a pool of molten tin in a forming chamber. The stream of molten glass is delivered from a glass furnace along a horizontal path over a threshold onto the surface of the pool of molten tin which is maintained at an elevation as close as can be maintained to the upper glass supporting surface of the threshold.

The glass is conveyed along the surface of the molten tin and is cooled to form a continuous sheet or ribbon of glass having a width of about 6 feet (1.83 meters). The width of the glass stream on the molten tin is maintained during forming. The inlet region of the forming chamber, the outlet or discharge end of the glass furnace and the delivery apparatus connecting the two are as shown in FIG. 1. Initially there is no reflector present in the apparatus.

The apparatus is provided with several temperature detection devices to monitor the process of delivering molten glass and forming it into flat glass. A radiation pyrometer is aimed at the molten glass just upstream of the control tweel to detect the temperature of the molten glass at that location. It is aimed at a location along the centerline of the stream of molten glass (immediately to the left of tweel 37 in FIG. 1). Another radiation pyrometer is aimed at the glass in the forming chamber at a location along its centerline and about 4 feet (1.22 meters) downstream from the downstream face of the control tweel (immediately to the right of reflector plate 53 in FIG. 1). Thermocouples are located in the flat arch downstream of the control tweel (in roof portion 43 in FIG. 1) and through the side walls of the forming chamber to extend into the molten tin about 4 feet (1.22 meters) downstream of the threshold. The speed of the glass moving through the forming chamber is determined from speed measurements using tachometers on annealing lehr rolls downstream of the forming chamber and on top rolls contacting the edge of the glass in the forming chamber. Sand traces and stop watches may also be used to determine the average speed of the glass over fixed distances in the forming chamber.

The physical and optical characteristics of the formed glass are determined from random samples of glass cut from the continuous sheet after formation and annealing. The width and thickness of the glass sheet are measured using conventional techniques (a steel tape and micrometer may be used). The optical distortion in the glass is measured using a distortion analyzer, such as described in the patent to Obenreder. The integrated sum of total optical distortion taken along the direction of draw (conveyance through the forming chamber) is considered most revealing of forming conditions. This optical distortion is measured at several locations across the width of the glass sheet or ribbon to yield average distortion sum with the draw for the left side of the sheet, an average for the right side of the sheet and an overall average for the sheet. The sum of total optical distortion is integrated over a standard arbitrary 22 inch (55.9 centimeters) length and is reported in dimensionless units characterized as units of distortion. So long as consistent units are employed (as they are here) their absolute numerical value is less important than the relative values for different operating conditions that are to be compared. Nevertheless, in the interests of completeness, these distortion units, D. A. Sum, are related to total optical distortion power, $P_t$, of U.S. Pat. No. 3,792,930 according to the following relationship $$D. A. \text{Sum} = \int_O^L |P_t|\, dl$$

where $L$ is a length of 22 inches (56 centimeters);

$|P_t|$ is the absolute value of the optical power; and $dl$ is the differential length.

A device such as shown in U.S. Pat. No. 3,792,930 may include the necessary electronic circuitry to carry out this integration with one D. A. Sum unit being approximately equal to 0.05 diopter-inch (about 0.13 centimeter per meter).

For a period of several days glass is produced without a radiation reflector in the inlet end of the forming chamber. The glass during the period has an average thickness of 0.138 inch (3.53 millimeters). It has an average D. A. Sum for the left side of the sheet of 44 and for the right side of 45.

The glass is produced at an average rate of 55 tons per day. The molten glass upstream of the tweel is maintained at an average temperature of 2080°F. (1140°C.); the flat arch has an average temperature of 2006°F. (1094°C.); and the glass 4 feet (1.22 meters) from the threshold has an average temperature of 1817°F. (992°C).

A single radiation reflector is installed across the full width of the glass just downstream of the tweel. Operating conditions are stabilized and glass production continued at a rate of 51 tons per day for several days. The molten glass upstream of the tweel has an average temperature of 2015°F. (1100°C); the flat arch has an average temperature of 1586°F. (863°C); and the glass 4 feet (1.22 meters) from the threshold has an average temperature of 1832°F. (1000°C).

The glass produced with the radiation reflector in place is 0.130 inch (3.30 millimeters) thick. It has an average D. A. Sum for the left side of the sheet of 30 and for the right side of 24 indicating much better quality glass than the glass made without a reflector in place.

EXAMPLE II

The procedures of Example I are repeated with the exception that thicker glass is produced and the initial operation is with no reflector while the desired operation is with two reflectors as shown in FIG. 1. The conditions and results are summarized with the conditions and results first listed corresponding to operation without a radiation reflector.

The thickness was 0.160 inch (4.1 millimeters) and remained in the same range at 0.165 inch (4.2 millimeters); the throughput was 51 tons per day and then 42 tons per day; the molten glass temperature upstream of the tweel was 2084°F. (1135°C.) and then 2025°F. (1108°C.); the flat arch temperature was 2018°F. (1100°C.) and then 1158°F. (656°C.); and the temperature of the glass 4 feet (1.22 meters) downstream of the threshold was 1793°F. (977°C.) in both instances.

The glass produced without the use of a radiation reflector has an average D. A. Sum for the left side of the sheet of 28 and for the right side of the sheet of 30. The glass produced using the reflectors has an average D. A. Sum for the left side of the sheet of 18 and for the right side of 18. The glass produced using the reflectors is of observably better optical quality than that produced without using the reflectors.

EXAMPLE III

The procedures of Example II are repeated except that again thicker glass is produced. Two reflectors are used as in Example II. The conditions and results are summarized with the conditions and results first listed corresponding to operation without a radiation reflector.

The thickness was 0.255 inch (6.5 millimeters) and remained in the same range at 0.235 inch (6.0 millimeters); the throughput was 62 tons per day and then 50 tons per day; the molten glass temperature upstream of the tweel was 2017°F. (1100°C.) and then 2021°F. (1102°C.); the flat arch temperature was 1961°F. (1071°C.) and then 1150°F. (652°C.); and the temperature of the glass 4 feet (1.22 meters) downstream of the threshold was 1615°F. (879°C) and then 1680°F. (915°C.).

The glass produced without the reflector has an average D. A. Sum for the left side of the sheet of 21 and for the right side of the sheet of 18. The glass produced with the reflectors has an average D. A. Sum for the left side of the sheet of 13 and for the right side of 25. The glass produced using the reflectors is observed to be slightly better in overall optical quality than that produced without the reflectors.

EXAMPLE IV

In a further modification of the method and apparatus of Example III glass having a thickness of 0.266 inch (6.75 millimeters) is produced at a rate of 61 tons per day. The radiation reflectors are removed and in place of the upstream reflector there is placed a pair of electric globar heaters which are heated to 2025°F. (1105°C.) applying 124 volts and 40 amperes to one heater and 128 volts and 38 amperes to the other heater.

The molten glass temperature upstream of the tweel is 2031°F. (1110°C.) and the temperature of the glass 4 feet (1.22 meters) downstream of the threshold is 1851°F. (1010°C.).

The glass produced has a D. A. Sum for the left side and also for the right side of the sheet of 6. The glass is of excellent quality.

In all the examples the stream of molten glass diminishes in thickness from about ¾ inch (1.98 centimeters) to about ¼ inch (0.83 centimeter) as it flows from beneath the tweel at the threshold to the location where its temperature is measured about 4 feet (1.22 meters) downstream from the threshold. This change is insensitive to the final thickness of the sheet of glass so long as its thickness is less than or about equilibrium thickness. The time it takes an average element of glass in the stream to travel along this initial length of the forming chamber is about two minutes in all examples.

Using this information the effectiveness of a reflector may be described in terms of its effectiveness to influence the rate of heat loss from the entering molten glass beneath it. The reflectors employed in the examples reduce the loss of heat from the molten glass during its initial two minutes in the forming chamber so that its rate of temperature decline is reduced on the order of 30° to 40°F. per minute (16.5°C. to 22.2°C. per minute); in Example I the rate of temperature decline changed from 131°F. per minute to 91°F. per minute when a reflector was used; in Example II the rate of temperature decline changed from 145°F. per minute to 116°F. per minute when the reflectors were used; and in Example III the rate of temperature decline changed from 201°F. per minute to 190°F. per minute when the reflectors were used. In Example IV the rate of temperature decline is reduced to 90°F. per minute by the use of heaters adjacent the flat arch.

Referring again to the examples and in particular to the optical distortion measurements, it may be noted that when the final glass thickness approaches equilibrium thickness, its optical quality is less sensitive to or dependent upon the thermal conditions in the glass immediately following delivery onto the molten metal for forming. It is also now expected that as the final glass thickness becomes extremely thin (below about 0.120 inch or about 3 millimeters) it also is less sensitive to the initial thermal control since the observed optical distortion is primarily a glass surface phenomenon developed before the glass is attenuated so that over some range of attenuation that attenuation merely enhances whatever surface characteristics have already been established. Thus, setting a D. A. Sum of 20 taken along the direction of draw as a desirable objective for glass thinner than equilibrium glass and 15 as a more desirable objective for all thicknesses of glass, it is now possible to reach these objectives. If the glass is maintained at a viscosity below about $10^5$ poises for its initial 2 minutes on the molten metal in the forming chamber and is cooled sufficiently slowly during this time, glass of improved optical quality can be produced. To produce glass having an average D. A. Sum along the direction of draw of less than 20, the initial thermal control should maintain the glass temperature decline at less than about 100°F. per minute (63°C. per minute) during the initial 2 minutes of residence on the molten metal. To produce glass having an average D. A. Sum of less than 15 the initial thermal control should maintain the glass temperature decline at less than about 30°F. per minute (17°C. per minute) during the initial 2 minutes of residence on the molten metal.

Although this invention has been described with reference to particular embodiments for the purpose of illustration those skilled in the art of glassmaking will appreciate that other embodiments of this invention may be made based upon the present disclosure. For example, the roof of the forming chamber may be so constructed to act as a reflector or heaters may be placed in the flat arch or roof to heat it to a temperature sufficient so that it cannot effectively receive the radiation from molten glass but will rather reflect it.

I claim:

1. In an apparatus for making glass comprising a glassmaking furnace for supplying molten glass, a forming chamber including a pool of molten metal for supporting glass and means for forming the glass into flat glass while supporting it on and conveying it along the molten metal, and means for delivering a layer of molten glass from the glassmaking furnace to the glass forming chamber and connecting a discharge end of the furnace to an inlet end of the forming chamber, the improvement comprising means, mounted inside the glass forming chamber, spaced from and facing the upper surface of the pool of molten metal for facing the upper surface of a delivered layer of molten glass, and spaced from an overlying roof portion of the forming chamber, for directing heat received from the molten glass substantially immediately following its delivery onto the molten metal back to the glass, said means being located inside the chamber in a zone of the chamber adjacent its inlet end where a delivered layer of glass is supported and conveyed prior to reaching a stable thickness.

2. The apparatus according to claim 1 wherein said means for directing heat comprises a heat reflective material capable of withstanding the temperature in the vicinity of the molten glass mounted across the forming chamber above the molten metal at a location immediately downstream of the end of the forming chamber adjacent the molten glass delivery means, wherein said heat reflective material presents a heat reflective surface in facing, spaced relation to the molten metal.

3. The apparatus according to claim 1 wherein said molten glass delivery means comprises means for delivering a wide, shallow stream of molten glass along a substantially horizontal path onto the pool of molten metal, and wherein said means for directing heat comprises a plate of heat reflecting material mounted above the molten metal and having a length extending from a location substantially adjacent the location at which molten glass is delivered onto the molten metal to a location sufficiently downstream therefrom to substantially retard the rate of heat loss from the molten glass immediately following its delivery onto the molten metal.

4. The apparatus according to claim 3 wherein said heat reflecting means has a width extending substantially across the portion of the width of the pool of molten metal for supporting molten glass.

5. The apparatus according to claim 4 wherein said heat reflecting means comprises a substantially flat plate spaced substantially uniformly from the pool of molten metal.

6. The apparatus according to claim 4 wherein said heat reflecting means comprises a plate having a downwardly facing convex heat reflecting surface that is closest to the molten metal near the center of the forming chamber and farthest therefrom near the sides of the forming chamber.

7. The apparatus according to claim 1 wherein said heat directing means comprises a plurality of plates of heat reflecting material, each having a width less than the width of the pool of molten metal and a length extending from the vicinity of the location at which molten glass is delivered onto the molten metal to a location downstream therefrom.

8. The apparatus according to claim 7 wherein a space is provided along the center of the forming chamber between adjacent heat reflecting plates.

9. The apparatus according to claim 1 wherein said heat directing means comprises a metal plate extending over and spaced from a portion of the molten metal near the location at which molten glass is delivered thereto.

10. The apparatus according to claim 9 wherein said heat directing means further comprises thermal insulation mounted above said metal plate.

11. The apparatus according to claim 1 further comprising second heat directing means located in the forming chamber downstream of said heat directing means for directing heat to glass substantially immediately following its delivery onto the molten metal.

12. The apparatus according to claim 11 wherein said downstream heat directing means is spaced from the molten metal a greater distance than is said heat directing means for directing heat to glass substantially immediately following its delivery onto the molten metal.

13. In a method of making glass comprising the steps of melting and refining glass, delivering a layer of molten glass onto a pool of molten metal, supporting it on and conveying it along the molten metal while cooling it to form a dimensionally stable continuous sheet of glass and thereafter withdrawing the continuous sheet of glass from the pool of molten metal, the improvement comprising retarding sufficiently the loss of heat from the upper surface of the layer of molten glass substantially immediately following its delivery onto the molten metal and before the layer of molten glass reaches a stable thickness to maintain its viscosity within the range of from $10^3$ to $10^5$ poises to cause the continuous sheet of glass to have observably diminished optical distortion along the direction of its conveyance during forming.

14. The method according to claim 13 wherein the molten glass is delivered onto the molten metal as a wide, shallow layer of molten glass flowing along a substantially horizontal path, and wherein heat is reflected to the layer of glass across its width as it is delivered onto the molten metal.

15. The method according to claim 14 wherein heat is reflected to the layer of glass substantially uniformly across its width.

16. The method according to claim 14 wherein more heat is reflected to the marginal portions of the layer of glass than to the central portion of the layer of glass.

17. The method according to claim 13 wherein heat loss from the molten glass is sufficiently retarded to maintain its viscosity within the range of from $10^3$ to $10^5$ poises for its initial 5 minutes of residence on the molten metal and to maintain its rate of temperature decline during its initial 2 minutes of residence below about 100°F. per minute.

18. The method according to claim 13 wherein heat loss from the molten glass is sufficiently retarded to maintain the initial rate of temperature decline of the glass during its initial 2 minutes of residence on the molten metal below about 90°F. per minute, and wherein sufficient force is applied to the glass during cooling to form a dimensionally stable continuous sheet of glass having a thickness less than that which would be attained at equilibrium with the molten metal.

19. The method according to claim 18 wherein the heat loss from the molten glass is sufficiently retarded to maintain the initial rate of temperature decline of the glass during its initial 2 minutes of residence on the molten metal below about 50°F. per minute.

* * * * *